United States Patent [19]

Smith

[11] Patent Number: 5,133,420

[45] Date of Patent: Jul. 28, 1992

[54] BEARING SUPPORT FOR A SCALE PLATFORM

[75] Inventor: Rodney Smith, Quitman, Miss.

[73] Assignee: Sunbeam Corporation, Providence, R.I.

[21] Appl. No.: 625,570

[22] Filed: Dec. 11, 1990

[51] Int. Cl.⁵ .......................................... G01G 21/08
[52] U.S. Cl. ................................... 177/256; 177/251; 177/260; 177/261; 177/DIG. 9
[58] Field of Search ................. 177/DIG. 9, 251, 256, 177/261, 260

[56] References Cited

U.S. PATENT DOCUMENTS

| | | | |
|---|---|---|---|
| 349,521 | 9/1886 | Sanger | 177/DIG. 9 X |
| 3,134,451 | 5/1964 | Hanssen | 177/256 |
| 3,193,034 | 7/1965 | Hutchinson | 177/256 |
| 3,844,365 | 10/1974 | Ek et al. | 177/256 |
| 4,452,326 | 6/1984 | Hanssen et al. | 177/256 |
| 4,456,086 | 6/1984 | Boyles | 177/256 |
| 4,458,771 | 7/1984 | Hanssen et al. | 177/256 |
| 4,521,658 | 6/1985 | Wyland et al. | 177/256 X |
| 4,609,069 | 9/1986 | Hale et al. | 177/256 |

FOREIGN PATENT DOCUMENTS 2364293 6/1975 Fed. Rep. of Germany.

Primary Examiner—George H. Miller, Jr.
Assistant Examiner—Randy W. Gibson
Attorney, Agent, or Firm—Arnold B. Silverman

[57] ABSTRACT

A weighing scale having a load receiving platform which delivers forces to a force collecting lever system mounted on the scale base by means of self adjusting bearing members projecting downwardly from said platform and secured to said platform by assembly tabs which permit limited freedom of movement in the horizontal plane.

9 Claims, 3 Drawing Sheets

BEARING SUPPORT FOR A SCALE PLATFORM

BACKGROUND OF THE INVENTION

This invention relates primarily to scales, and more specifically, to a bearing mechanism for the support of a platform in a domestic scale.

The typical domestic platform scale includes two generally flat housing portions, one being a base and the other being a platform which is superimposed over the base and substantially coextensive therewith. The base includes a peripheral, upstanding flange which is received inside of a corresponding downwardly extending peripheral flange on the platform. The weighing mechanism is supported on the base in the area between the platform and the base.

The weighing mechanism typically includes a number of force collecting levers which are pivotally supported at one end in each of the corners of the base and have means for delivering a force to a spring, the deflection of which is measured to indicate the weigh applied to the platform. To transfer the weight or force produced by the weight on the platform to the force collecting levers, there are typically four bearing members in the corners of the platform which transfer force to the four levers mounted on the base. It is important that the forces be applied precisely to the pre-determined bearing points located on each of the four levers. In the past, this has required a multi-piece bearing, as shown in the U.S. Pat. No. to Hanson, No. 3,134,451. The approach disclosed in the Hanson patent involved a bearing post pivotally supporting a rocking member or link which could adjust in its engagement with the force collecting lever to avoid the introduction of any binding or twisting moments to the lever in transferring the downward force from the platform to the force collecting lever.

Several attempts have been made in the past to simplify this platform bearing structure, one being shown in U.S. Hanson, et al. Pat. No. 4,452,326 and another in the German Offenlegungsschrift 2,364,293. Both of these prior art patents teach the concept of having a one-piece bearing member which is loosely connected to the platform so that it may pivot or rock to adjust itself to proper engagement with the bearing portion on the force collection lever. The concept of having the one-piece bearing member pivot about a point on the platform prevents the application of a pure vertical force to the force collecting lever and increases the possibility that an undesired binding or force moment will be applied to the force collection lever.

SUMMARY OF THE INVENTION

The present invention provides a simplified, one-piece bearing which represents an improvement in the prior art in that it exerts a pure downward force between the scale platform and the force collection lever which it engages. The bearing member consists of a base portion with flanges in a single plane and a column portion which extends normal to the plane of these flanges. At the top of the column there is provided a slot and a bearing edge, the slot being adapted to receive the force collection lever, and the bearing edge to bear in a V notch on the lever. Tabs formed on the under side of the platform are positioned to extend loosely through slots in the flanges of the base portion of the bearing so that when the tabs are bent over, the bearing is supported for limited movement in a horizontal plane, either lengthwise or transverse of the force collection lever to which it is applied.

It is an object of the present invention to provide an improved bearing support for the platform in a domestic weighing scale.

It is a further object of the present invention to provide a simplified one-piece bearing for applying the force from a scale platform to the force collecting levers whereby the forces are applied vertically with no binding or twisting between the force collection levers and their mounting means.

Another object of the present invention is to provide an improved domestic scale having the platform supported by four floating bearing supports which are movable to align themselves with the points of engagement between the bearing supports and the force collection levers to apply only vertical forces to the levers.

Another object of the present invention is to provide a platform having four one-piece bearing members which are loosely secured to the platform by deformable tabs integrally punched from the scale platform.

BRIEF DESCRIPTION OF THE DRAWINGS

Referring to FIG. 1 of the drawings, there is shown a domestic scale designated generally by reference numeral 12. The scale 12 includes a load support platform 14 and a base 16. The base 16, as best shown in FIGS. 2, 3 and 5, includes a substantially flat horizontal base portion 16a and an upstanding peripheral wall 16b. The platform 14 is substantially coextensive and spaced from the base 16 having a flat support portion 14a and a peripherally and downwardly extending flange 14b. As best shown in FIG. 3, the platform 14 extends beyond the base 16 with the peripheral flange 14b extending downwardly and overlapping the upwardly extending wall 16b on the base 16.

Figure 3:
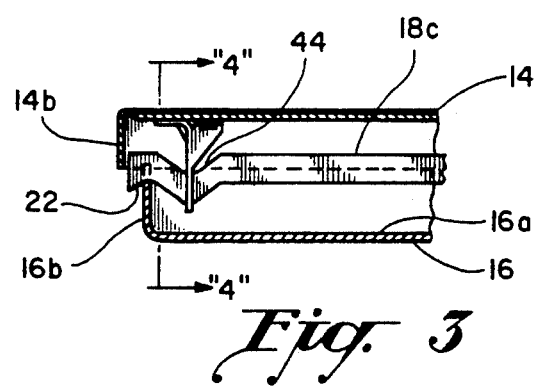
FIG. 3 is a sectional view taken on line 3—3 of FIG. 1.

The platform 14 and the base 16 form an enclosure within which force collection levers 18 and an weighing mechanism 20 are located. The force collection levers include primary levers 18a and 18b and secondary levers 18c and 18d. All four of the levers 18a, 18b, 18c and 18d have their outermost ends resting in slots 16c formed in the corners and the upper edges of the walls 16b to provide bearing surfaces for the outer ends of the force levers 18a, 18b, 18c and 18d. As best shown in FIG. 3, each of the force levers includes a downwardly facing V-shaped notch 22 which engages in the slot 16c and forms the bearing on the force lever and serves to locate the force lever against lengthwise displacement.

Figure 5:
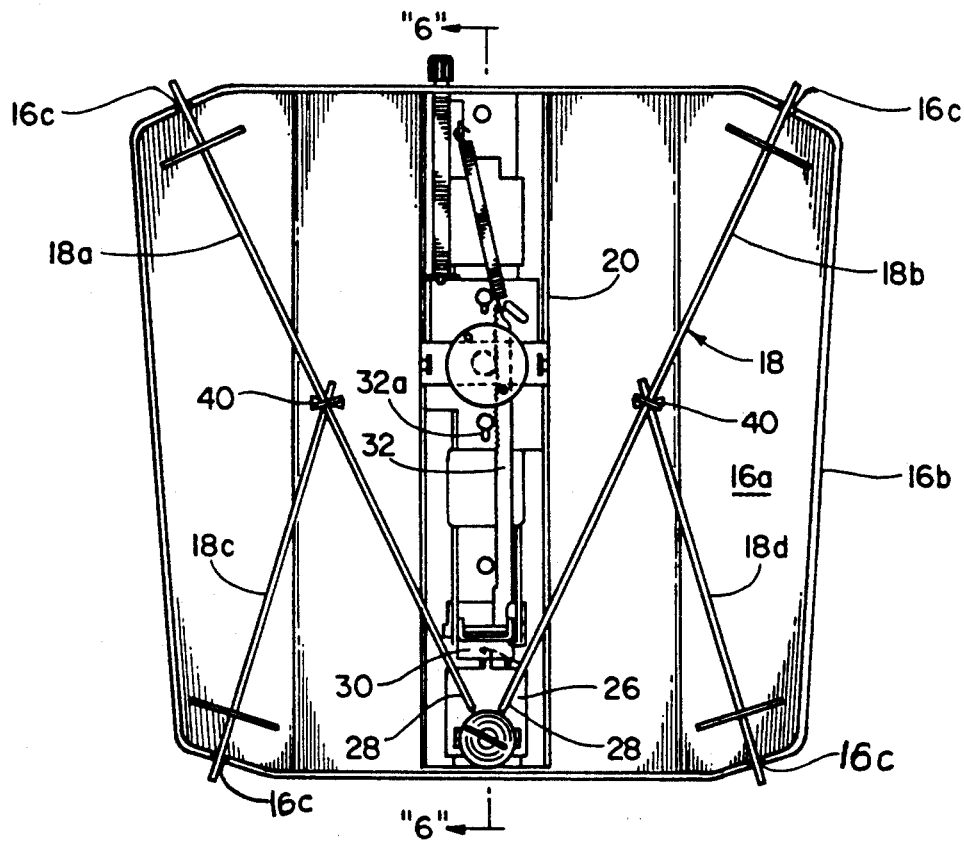
FIG. 5 top plan view of the scale of FIG. 1 with the platform removed to expose the force collection levers and weight indicating mechanism.
Figure 6:
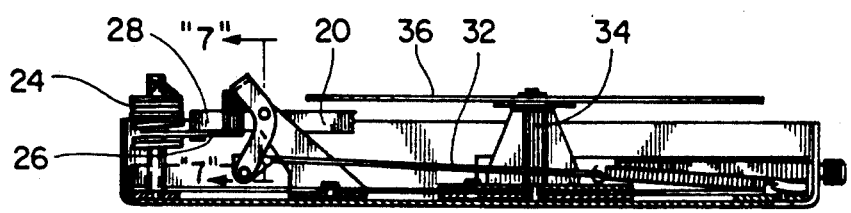
FIG. 6 is a sectional view taken substantially on line 6—6 of FIG. 5.
Figure 7:
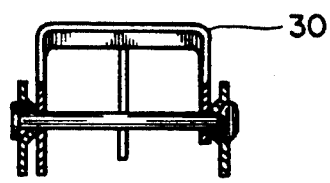
FIG. 7 is an enlarged, fragmentary sectional view taken on lines 7—7 of FIG. 6.
Figure 8:
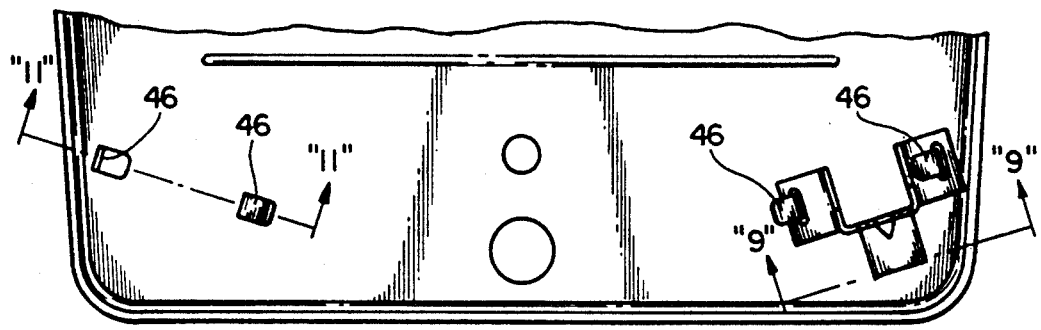
FIG. 8 is a plan view of of a portion of the under side of the platform with only the lower right bearing member assembled thereto.

Referring to the weighing mechanism 20, it forms no part of the present invention and may include a mechanical mechanism utilizing a spring as disclosed in the drawings including FIGS. 5, 6 and 7 and described in detail in Hanssen U.S. Pat. No. 3,134,451, assigned to the same assignee as the present invention. Alternatively, the weighing mechanism can be of the electronic strain gauge or pulse count variety as are well known in the domestic scale art. In the disclosed embodiment, the weighing mechanism 20 includes a spring 24 which is deformed and displaced by application of force to a plate 26 which is engaged by the ends 28 of the primary force levers 18a and 18b. The force levers 18a and 18b cause the plate 26 to be forced downwardly against the action of the spring 24. The amount of displacement of the plate 26 is proportional to the weight applied to the platform 14 or to the force exerted by the levers 18a and 18b. This downward displacement of the plate 26 is sensed through a lever 30 and a link 32, the link having a rack 32a formed thereon. The rack 32a cooperates with a pinion 34 to rotate a shaft supporting an indicia bearing disk 36. The indicia bearing disk 36 is visible through a window 14c in the platform 14. The window is provided with an index line 38 which cooperates with the disk 36 to provide a weight reading as is well known in the art.

Referring again to the force collection levers 18, it is noted that the secondary levers 18c and 18d are interconnected by links 40 with a result that the forces applied on the levers 18a, 18b, 18c and 18d are added together and applied to the plate 26 so that the weighing mechanism 20 will provide an indication of the total weight applied to the platform 14.

Figure 10:
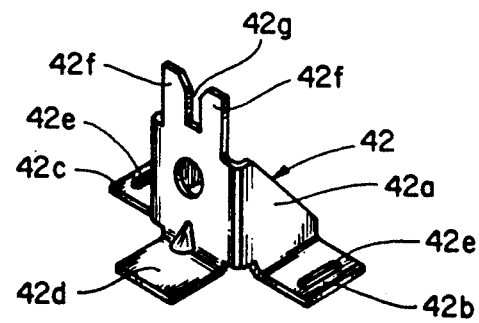
FIG. 10 is a perspective view of the bearing member.
Figure 9:
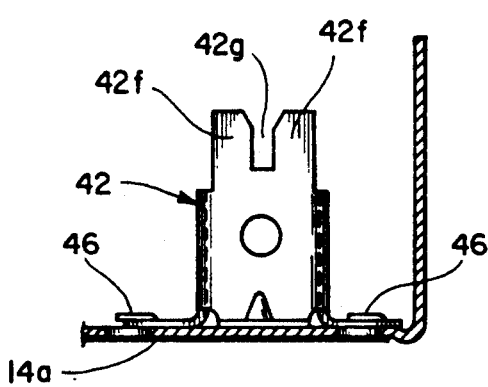
FIG. 9 is a fragmentary, sectional view taken on line 9—9 of FIG. 9.

For the purpose of applying the force from the platform 14 to the force collection levers 18, there are provided four bearings or bearing members 42, one of which is shown in perspective in FIG. 10. Each bearing 42 includes a somewhat channel-shaped column portion 42a and a base or stand portion made up of the flanges 42b, 42c and 42d. The oppositely extending flanges 42b and 42c are formed with elongated slots 42e.

Figure 1:
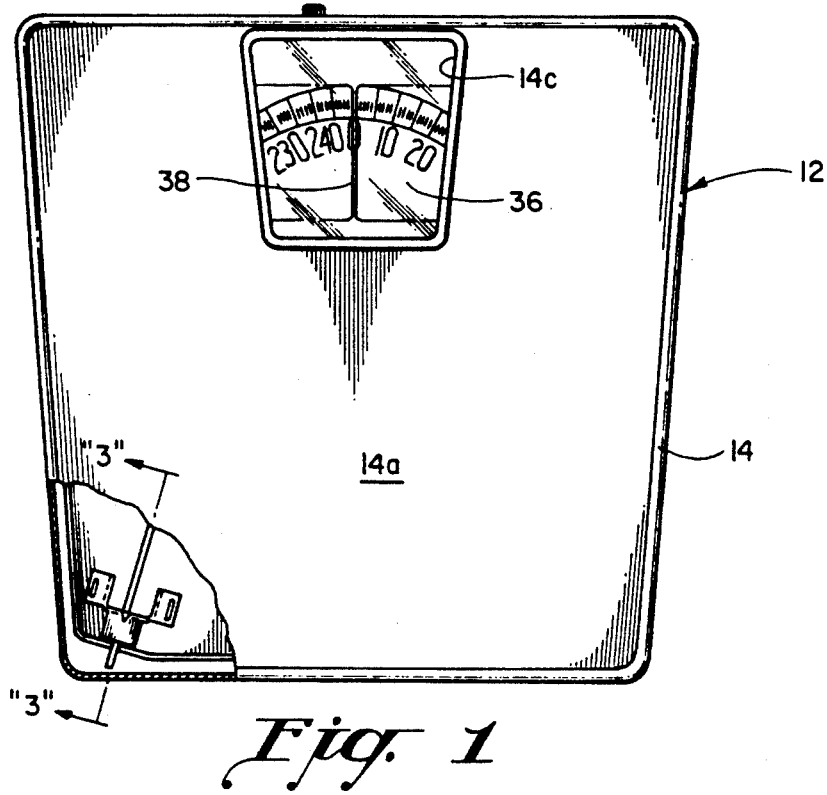
FIG. 1 is a top plan view of a domestic scale having a portion platform cut away to expose the novel bearing forms a part of my invention.
Figure 2:
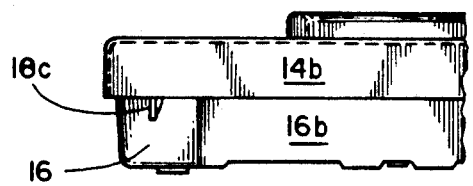
FIG. 2 is fragmentary, front, elevational view of the scale of FIG. 1.
Figure 4:
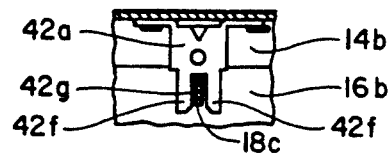
FIG. 4 is a fragmentary, sectional view taken substantially on line 4—4 of FIG. 3.

At the upper end of the bearing 42, as shown in FIG. 10, the column portion 42a is formed with two spaced projections 42f between which is formed a slot 42g. The bearing members 42 are mounted on the underside of the platform 14 as illustrated in FIGS. 1, 3 and 4 which show only one of the bearing members. The purpose of the slot 42g formed in the end of the downwardly extending column portion 42a is to receive the force lever as is shown in FIG. 4. In a preferred embodiment of the invention the slot 42g is about thirty-thousandths of an inch (0.030) wider than the thickness of the force lever received therein, allowing some latitude for alignment and displacement. As best shown in FIG. 3, each force lever is formed with an open, upwardly facing V-shaped notch or bearing recess 44 into which the end of the column 42a, and more particularly, the end of the slot 42g engages the force lever. Thus, as a weight is applied to the platform 14, that downward force is transmitted through the four bearing members 42 to the force collecting levers 18a, 18b, 18c and 18d, thereby causing the force levers to rotate downwardly about their outer ends which are pivotally supported in the slots 16c formed on the peripheral walls 16b and the base 16.

If the weighing mechanism is to be accurate and produce repeatable, consistent measurements, the force applied through the bearing members 42 must be vertical, causing rotational movement of the force collecting levers but may not include a twisting or lengthwise moment of force on the force levers or additional friction would be introduced to produce inaccuracies and inconsistent weight measurement.

Figure 11:
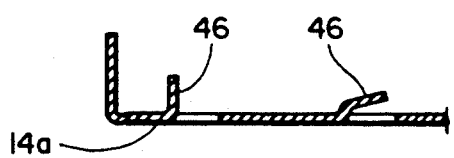
FIG. 11 a fragmentary sectional view taken on line 11—11 of FIG. 8.

Because of the manufacturing tolerances which are found to cause dimensional differences between the location of the notches or bearing recesses 44 on the force levers 18a, 18b, 18c and 18d, it is necessary to have some means in the mechanism transmitting the force from the platform 14 to the force collection levers 18 to accommodate these dimensional variances so that there will not be binding between the parts and the forces applied to the levers will be strictly vertical. In order to accomplish this desired result, the bearing members 42 are mounted to the under side of the platform 14 with a loose connection so that the bearing members 42 may be displaced in the horizontal direction while at the same time being maintained vertical. To accomplish this objective, the bearing members 42 are mounted to the platform 14 by tabs 46 formed integrally from the sheet metal member which forms the platform 14. The tabs 46 are shown in FIG. 11 as they appear prior to assembly of the bearing member 42 to the platform 14. These tabs are inserted through the slots 42e on the flanges 42b and 42c and are bent over to secure the base portion of the bearing members 42 against the lower face of the platform 14 but with sufficient clearance so that the bearings may move horizontally with respect to the platform 14. This limited freedom of movement is accomplished by making the width and length of the slots 42e sufficiently larger than the thickness and width of the tabs 46 so that such movement may take place.

In the preferred embodiment of the invention the amount of permitted movement either lengthwise of the force levers or transverse of the force levers is about 1/16" or 0.0625". As a result of this clearance providing limited tolerance for movement between the bearings 42 and the platform 14 the four bearing members 42 may move lengthwise of the force levers to center themselves at the bottom of the notches 44 and also align themselves transversely of the levers so that no binding will occur as the force on the platform 14 is applied vertically through the bearings 42. The result is a simple and inexpensive expedient to transmit the force from the platform to the force collecting levers providing a pure vertical application of forces to the levers while avoiding any twisting or lengthwise forces in the levers which might create friction in the bearings for the force levers 18a, 18b, 18c and 18d which would in turn introduce error in the measurements made by the scale. The bearing members 42 are formed sheet metal members which are inexpensive and easy to manufacture. The tabs 46 which interconnect the bearing members 42 to the platform 14 are formed integrally from the sheet metal of the platform and are inherently inexpensive to form and provide a simple assembly device.

I claim:

1. A platform scale comprising a base having means for pivotally supporting a plurality of force collecting levers, having two ends each of said levers being pivoted at one end and being connected to force measuring means which responds to pivotal movement of said levers, a platform coextensive with said base and having an underside, said platform extending horizontally to support a load to be weighted, bearing members mounted on the underside of said platform to support said platform with respect to said base with said bearing members engaging said levers intermediate their ends to apply a rotating force to said levers in response to a load on said platform, said bearing members being loosely coupled to said platform permitting horizontal displacement, said bearing members each having stand portions and depending column portions each, said depending column portions having a lower end, assembly means on said stand portions and on said platform retaining said stand portions in face-to-face engagement with the underside of said platform and permitting limited displacement of said bearing members in a horizontal direction, each said lever being formed with an upwardly facing notch which receives a horizontally extending edge on the lower end of said depending column portion, said assembly means permitting said body members to shift horizontally to align said edges in said notches.

2. The platform scale of claim 1 wherein said assembly means comprises a pair of spaced tabs formed in said platform and extending downward from the underside thereof and slots formed in said stand portions of said bearing members to receive said tabs, said slots being substantially larger than said tabs to allow relative horizontal displacement of said bearing members with respect to said tabs.

3. The platform scale of claim 2 wherein each said depending column portion is generally channel shaped, the lower end of each said depending column portion being formed with a pair of projections separated by said edge, each of said pair of projections straddling one of said levers to maintain one of said edges engaged with one of said notches.

4. The platform scale of claim 3 wherein said stand portion of each said bearing member comprises a plurality of coplanar plates extending outwardly from the upper end of said depending column portion to maintain said depending column portion normal to said platform.

5. The platform scale of claim 2 wherein one of said tabs of each pair is L-shaped having an outer end formed to extend parallel to said platform and spaced therefrom with a portion of said stand portion being slidably received between said outer end and said platform, and the other tab of each said pair extending through a slot in said stand portion and being formed to retain said stand portion against said platform.

6. The platform scale of claim 5 wherein said other tab of each pair is L-shaped and substantially identical in shape to each said one of said tabs having an outer end coplanar with said outer end of each of said one of said tabs.

7. The platform scale of claim 2 wherein each said bearing member being movable horizontally with respect to said platform a distance lengthwise of the lever on which it engages of at least thirty-thousandths of an inch and a distance transverse of the lever on which it engages of at least thirty-thousandth of an inch.

8. A platform scale comprising a base supporting a plurality of force collecting levers, having two ends said base being substantially horizontal and having a generally upwardly extending wall around a peripheral portion thereof, each of said levers having a downwardly facing bearing notch at one end, each said notch receiving said wall to pivotally support each said lever, said levers being connected to force measuring means which respond to pivotal movement of said levers, a platform coextensive with said base and extending horizontally to support a load to be weighed, said base being substantially rectangular and having one or more corners and an underside, said platform having bearing members mounted near the corners on the underside thereof to support said platform with respect to said base with said bearing members engaging said levers intermediate their ends to apply a rotating force to said levers in response to a load on said platform, assembly means on said bearing members and on said platform retaining said bearing means in sliding engagement with the underside of said platform and permitting limited displacement of said bearing members in a horizontal plane, said assembly means having spaced projections and slots formed in said bearing members and said platform, said slots being substantially larger than said projections to allow relative horizontal displacement of said bearing members with respect to said platform, each said lever being formed with an upwardly facing bearing notch which receives a horizontally extending edge on a lower end of each of said bearing members, said assembly means permitting said bearing members to shift horizontally with respect to said platform to align said edges and said bearing members with respect to said upwardly facing notches.

9. The platform scale of claim 8 wherein said bearing members each include a flat base portion mounted in sliding engagement with said platform, said slots being formed in said base portion, said projections being mounted in said platform to extend downwardly through said slots, said projections having portions which clamp said base portion against the underside of said platform.

* * * * *